(12) United States Patent
Kim et al.

(10) Patent No.: US 9,319,748 B2
(45) Date of Patent: Apr. 19, 2016

(54) USER TERMINAL APPARATUS, SERVER, AND METHOD FOR PROVIDING BROADCAST VIEWING PATTERN INFORMATION

(71) Applicant: SAMSUNG ELECTRONICS CO., LTD., Suwon-si (KR)

(72) Inventors: Byung-jin Kim, Suwon-si (KR); Seok-hyun Yoon, Seongnam-si (KR); Hyung-dong Lee, Seoul (KR); Yoon-hee Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/507,905

(22) Filed: Oct. 7, 2014

(65) Prior Publication Data

US 2015/0100975 A1   Apr. 9, 2015

(30) Foreign Application Priority Data

Oct. 7, 2013 (KR) ........................ 10-2013-0119232

(51) Int. Cl.
*H04N 7/16* (2011.01)
*H04N 21/482* (2011.01)
*H04N 21/24* (2011.01)
*H04N 21/266* (2011.01)
(Continued)

(52) U.S. Cl.
CPC ....... *H04N 21/4826* (2013.01); *H04N 21/2407* (2013.01); *H04N 21/2408* (2013.01); *H04N 21/25891* (2013.01); *H04N 21/266* (2013.01); *H04N 21/488* (2013.01); *H04N 21/4828* (2013.01)

(58) Field of Classification Search
CPC ................... H04N 21/4826; H04N 21/25891; H04N 21/266; H04N 21/4828; H04N 21/2408; H04N 21/488; H04N 21/2407
USPC .......................................... 725/14, 16, 19, 46
See application file for complete search history.

(56) References Cited

U.S. PATENT DOCUMENTS 7,770,193 B2   8/2010   Lee
7,954,120 B2   5/2011   Roberts et al.
(Continued)

FOREIGN PATENT DOCUMENTS

EP          1 852 989 A1    11/2007
KR     10-2012-0125766      2/2001
KR     10-2007-0108175   *  11/2007   ............... H04H 9/00

OTHER PUBLICATIONS

International Search Report for PCT/KR2014/009297 dated Jan. 9, 2015 [PCT/ISA/210].
(Continued)

*Primary Examiner* — Hoang-Vu A Nguyen-Ba
(74) *Attorney, Agent, or Firm* — Sughrue Mion, PLLC (57) ABSTRACT

A method of providing viewing pattern information of a user terminal apparatus is provided. The method includes: transmitting content viewing information of the user terminal apparatus to a server; receiving information about a channel on which a content is broadcast among a plurality of channels that are on air, from the server; requesting viewing pattern information of the plurality of channels from the server; and receiving and displaying viewing pattern information, which is calculated based on a viewer rating acquired by aggregating the transmitted channel information, from the server.

20 Claims, 10 Drawing Sheets

(51) Int. Cl.
*H04N 21/258* (2011.01)
*H04N 21/488* (2011.01)
*G06F 3/00* (2006.01)

(56) References Cited

U.S. PATENT DOCUMENTS

| | | |
|---|---|---|
| 8,006,259 B2 | 8/2011 | Drake et al. |
| 2002/0078441 A1 | 6/2002 | Drake et al. |
| 2002/0087969 A1 | 7/2002 | Brunheroto et al. |
| 2010/0011389 A1 | 1/2010 | Lee et al. |
| 2010/0211439 A1 | 8/2010 | Marci et al. |
| 2010/0306806 A1 | 12/2010 | Kim et al. |
| 2012/0059845 A1 | 3/2012 | Covell et al. |
| 2012/0331497 A1 | 12/2012 | Randolph et al. |
| 2013/0132994 A1 | 5/2013 | Murphy et al. |
| 2013/0145395 A1 | 6/2013 | Jeong et al. |

OTHER PUBLICATIONS

Written Opinion for PCT/KR2014/009297 dated Jan. 9, 2015 [PCT/ISA/237].

\* cited by examiner

USER TERMINAL APPARATUS, SERVER, AND METHOD FOR PROVIDING BROADCAST VIEWING PATTERN INFORMATION

CROSS-REFERENCE TO RELATED APPLICATION(S)

This application claims priority from Korean Patent Application No. 10-2013-0119232, filed on Oct. 7, 2013, in the Korean Intellectual Property Office, the disclosure of which is incorporated herein by reference in its entirety.

BACKGROUND

1. Field

Methods and apparatuses consistent with the exemplary embodiments relate to providing a user terminal apparatus and a server for providing broadcast viewing pattern information, and more particularly, to providing a user terminal apparatus, a server, and a method for aggregating viewer ratings in real time to provide broadcast viewing pattern information.

2. Description of the Related Art

A viewer rating service provider such as the Nielson Company collects and analyzes information about a channel that is being viewed, by using a meter to record the viewing habits of viewers. The meter is installed in a television (TV), and provides viewer ratings related to the viewed programs on a webpage.

Viewer rating information provided as described above is widely used as past statistical analysis materials but is not used as real-time feedback in business. In other words, this type of business model is nonexistent.

For example, many viewers may wonder about a broadcast program that is most popular to viewers at a present time. If the viewers know about real-time viewer rating information, the viewers may easily obtain the needed information.

Also, a related art viewer rating survey technology is a method of doing a sample survey with respect to a limited terminal apparatus and thus is difficult to accurately detect changes in viewer rating patterns.

Additionally, it is difficult for viewers to search for all channels due to various types of contents in a multi-channel era. However, if the viewers know about real-time viewer ratings, the viewers may use the real-time viewer ratings. In particular, a mobile terminal apparatus has a high transmission volume when receiving signals of all channels from a broadcasting station. However, if a user of the mobile terminal apparatus knows about real-time viewer rating information, the user may easily selectively receive only a desired broadcast signal.

SUMMARY

Exemplary embodiments address at least the above problems and/or disadvantages and other disadvantages not described above. Also, the exemplary embodiments are not required to overcome the disadvantages described above, and an exemplary embodiment may not overcome any of the problems described above.

The exemplary embodiments provide a technique for acquiring and feeding back viewing information from a user terminal apparatus in real time to provide viewing pattern information in real time in order to easily search the user terminal apparatus for a broadcast.

The exemplary embodiments provide a technique which does not acquire viewing information from some apparatuses, but acquires and processes viewing information from all apparatuses that view a broadcast in order to provide accurate viewing pattern information.

According to an aspect of the exemplary embodiments, there is provided a user terminal apparatus comprising: a display; a communicator configured to transmit content viewing information of the user terminal apparatus to a server and receive information about a channel on which a content is broadcast among a plurality of channels that are on air or active, from the server; and a controller configured to request viewing pattern information of the plurality of channels from the server and receive and display viewing pattern information, which is calculated based on a viewer rating acquired by aggregating the transmitted channel information, from the server.

The controller may control to transmit electronic program guide (EPG) information or fingerprint information about a content that is viewed to the server.

The controller may control to receive and display viewer rating change information of each channel.

When a viewer rating of an interested channel set by a user increases, the controller may control to receive and display a content of the interested channel.

When it is determined that the user terminal apparatus is a user terminal that performs channel zapping, the controller may control to receive and display a channel which is most requested by users.

According to another aspect of the exemplary embodiments, there is provided a server comprising: a communicator configured to receive content viewing information from a user terminal apparatus, search for information about a channel on which a content is broadcast among a plurality of channels that are on air based on the received content viewing information, and transmit the channel information to the user terminal apparatus; and a controller configured to aggregate the transmitted channel information in order to calculate a viewer rating of each channel and, when the user terminal apparatus requests viewing pattern information, control to provide the user terminal apparatus with the viewing pattern information comprising viewer rating information about the transmitted channel.

The controller may control to receive Electronic Program Guide (EPG) information or fingerprint information of a content that is viewed, from the user terminal apparatus.

The server may control to provide viewer rating change information of each channel.

When a viewer rating of an interested channel set by a user of the user terminal apparatus increases, the server may control to provide a content of the interested channel.

When it is determined that the user terminal apparatus is a user terminal that performs channel zapping, the server may control to provide information about a channel which is most requested by users.

According to another aspect of the exemplary embodiments, there is provided a method of providing viewing pattern information of a user terminal apparatus. The method comprising: transmitting content viewing information of the user terminal apparatus to a server; receiving information about a channel on which a content is broadcast among a plurality of channels that are on air, from the server; requesting viewing pattern information of the plurality of channels from the server; and receiving and displaying the viewing pattern information, which is calculated based on a viewer rating acquired by aggregating the transmitted channel information, from the server.

The transmitting of the convent viewing information of the user terminal apparatus to the server may comprise: transmitting electronic program guide (EPG) information or fingerprint information about a content that is viewed to the server.

The receiving and displaying of the viewing pattern information may comprise: receiving and displaying viewer rating change information of each channel.

The receiving and displaying of the viewing pattern information may comprise: when a viewer rating of an interested channel set by a user increases, receiving and displaying a content of the interested channel.

The receiving and displaying of the viewing pattern information may comprise: when it is determined that the user terminal apparatus is a user terminal that performs channel zapping, receiving and displaying a channel onto which is most requested by users.

According to another aspect of the exemplary embodiments, there is provided a method of providing viewing pattern information of a server. The method comprising: receiving content viewing information from a user terminal apparatus; searching for information about a channel on which a content is broadcast among a plurality of channels that are on air based on the received content viewing information, and transmitting the channel information to the user terminal apparatus; aggregating the transmitted channel information to calculate a viewer rating of each channel; and when the user terminal apparatus requests viewing pattern information, providing the user terminal apparatus with the viewing pattern information comprising viewer rating information about the transmitted channel.

The receiving the content viewing information from the user terminal apparatus may include: receiving Electronic Program Guide (EPG) information or fingerprint information about a content that is viewed, from the user terminal apparatus.

The providing of the viewing pattern information may comprise: providing viewer rating change information of each channel.

The providing of the viewing pattern information may comprise: when a viewer rating of an interested channel set by a user of the user terminal apparatus increases, providing a content of the interested channel.

The providing of the viewing pattern information may comprise: when it is determined that the user terminal apparatus is a user terminal that performs channel zapping, providing information about a channel which is most requested by users.

BRIEF DESCRIPTION OF THE DRAWINGS

The above and/or other aspects will be more apparent by describing certain exemplary embodiments with reference to the accompanying drawings, in which.

DETAILED DESCRIPTION OF THE EXEMPLARY EMBODIMENTS

Exemplary embodiments are described in greater detail with reference to the accompanying drawings.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail.

Figure 1:
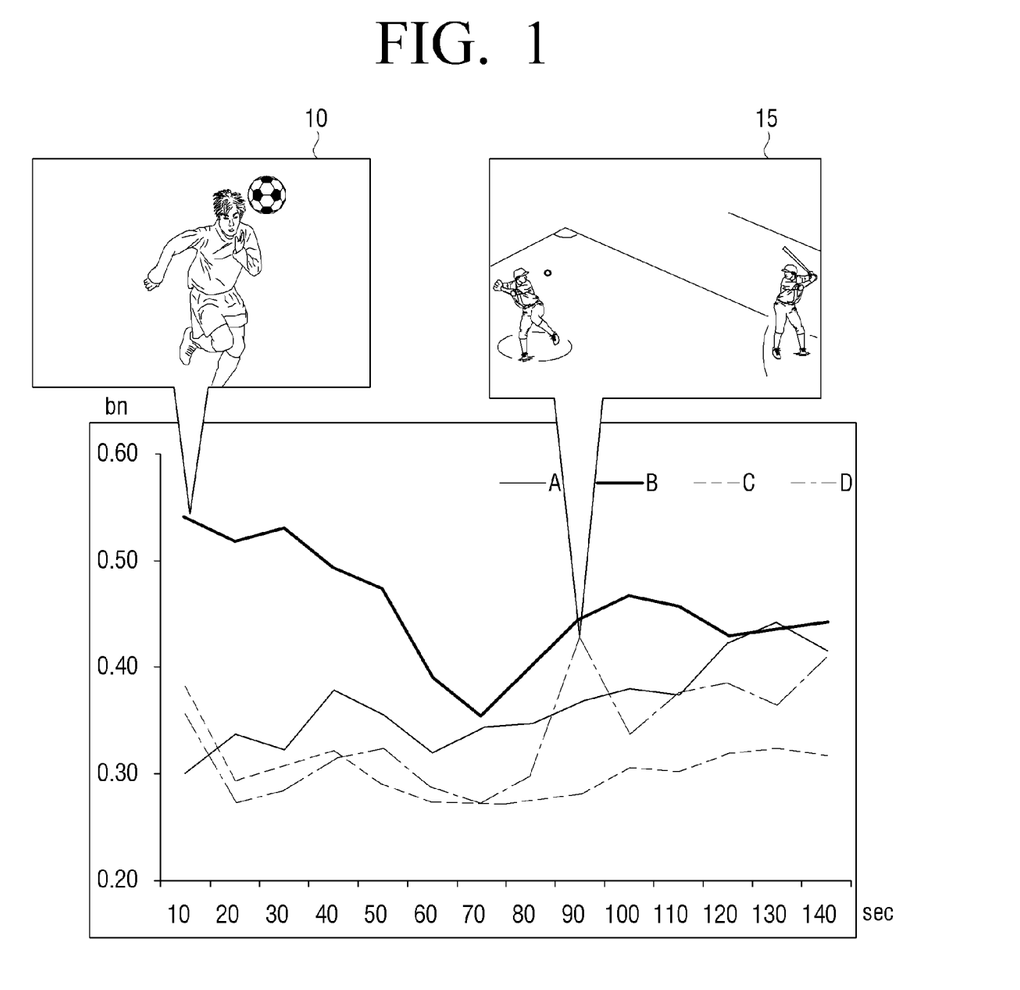
FIG. 1 is a referential view illustrating a method of providing viewing pattern information according to an exemplary embodiment.

FIG. 1 is a referential view illustrating a method of providing viewing pattern information according to an exemplary embodiment.

The exemplary embodiment provides a service that may collect and analyze viewing trend information of all viewers viewing contents through a large-scale server in real time to immediately provide viewing pattern information to the viewers through a user terminal apparatus.

Hourly viewer rating trends of broadcast channels A, B, C, and D are illustrated in FIG. 1. A horizontal axis denotes a viewing time, and viewer ratings are collected in the unit of 10 seconds. A vertical axis denotes the number of viewers in the unit of billion. About 0.5 hundred million viewers view the channel B at a moment (10) when a soccer player traps a ball, and then a viewer rating is lowered. A viewer rating of the channel D is continuously lowered in comparison with the channel B, but about 0.4 hundred million viewers view the channel B at a moment (15) when a baseball broadcast starts, and thus the viewer rating soars. After that, the viewing rating of the channel D is maintained.

According to the exemplary embodiment, a viewing pattern is collected and analyzed in real time and then provided to a user terminal apparatus. Therefore, a user of the user terminal apparatus may easily know which channel is currently popular and may easily move to the corresponding channel. Technical structure and operation of the exemplary embodiment will now be described in detail.

Figure 2:
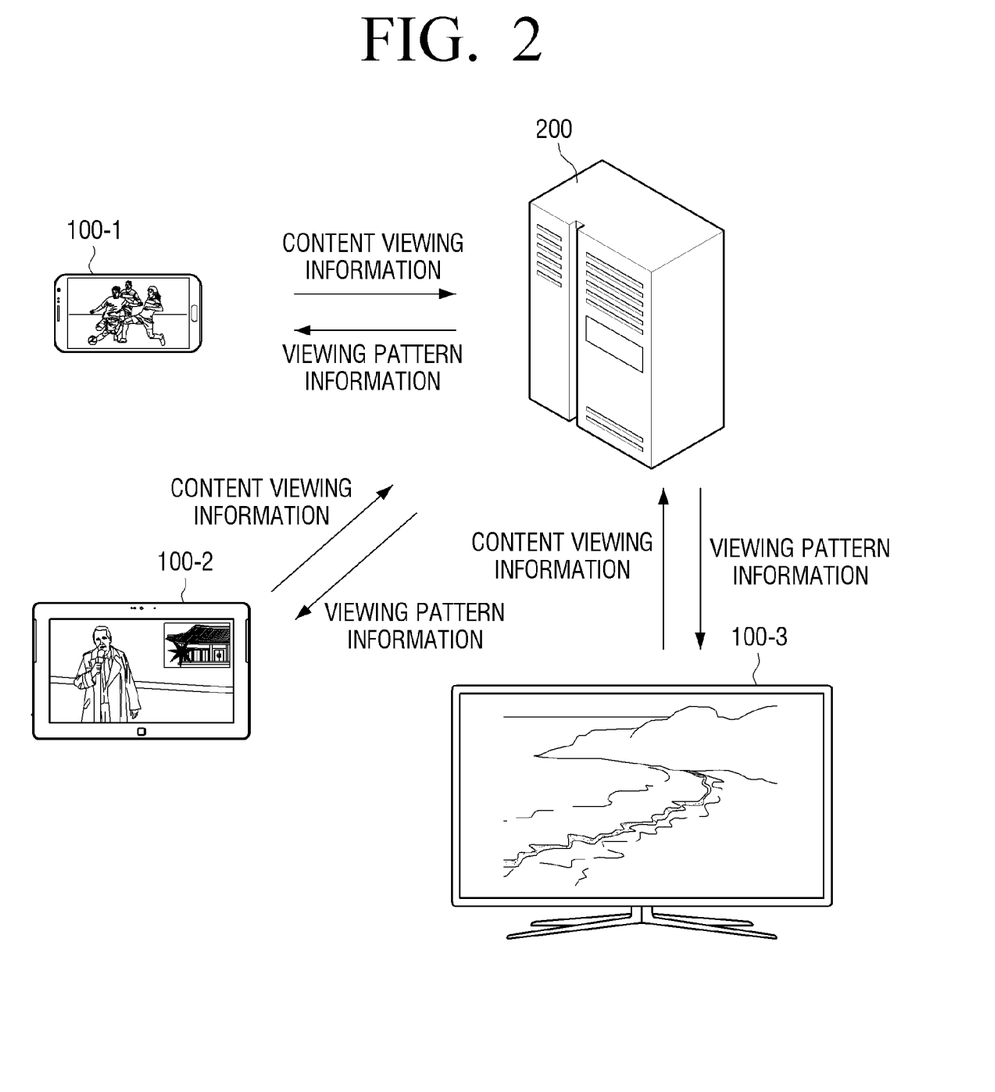
FIG. 2 is a view illustrating a structure of a system for providing viewing pattern information according to an exemplary embodiment.

FIG. 2 is a view illustrating a structure of a system for providing viewing pattern information according to an exemplary embodiment.

Referring to FIG. 2, the system includes at least one user terminal apparatuses 100-1, 100-2, and 100-3 and a server 200.

The user terminal apparatuses 100-1, 100-2, and 100-3 provide content viewing information to the server 200. The user terminal apparatuses 100-1, 100-2, and 100-3 provide the content viewing information to acquire channel information of the user terminal apparatuses 100-1, 100-2, and 100-3 from the server 200. The user terminal apparatuses 100-1, 100-2, and 100-3 may receive viewing pattern information from the server 200. If the viewing pattern information is received, the user terminal apparatuses 100-1, 100-2, and 100-3 display the viewing pattern information. A user may see the viewing pattern information and use the viewing pattern information to perform a user input for changing a current channel into a desired channel.

The server 200 receives content viewing information from the at least one user terminal apparatuses 100-1, 100-2, and 100-3 and searches for a channel on which contents are broadcast. The server 200 transmits information about the searched channel to the user terminal apparatuses 100-1, 100-2, and 100-2. The server 200 aggregates viewer ratings on the searched channel whenever the content viewing information is received from the user terminal apparatuses 100-1, 100-2, and 100-3. If there are requests of the user terminal apparatuses 100-1, 100-2, and 100-3, the server 200 provides the viewer ratings as viewing pattern information. The search for the channel, the aggregating of the viewer ratings, and the providing of the viewing pattern information may be respectively performed by separate servers.

As shown in FIG. 2, a user terminal apparatus may be realized as various types of mobile apparatuses. For example, the user terminal apparatus may be realized as at least one of a smartphone, a tablet personal computer (PC), a smart watch, smart glasses, a portable multimedia player (PMP), an MP3 player, a personal digital assistant (PDA), a cellphone, laptop computer, a smart TV, and other mobile terminal apparatuses. However, the user terminal devices are not limited thereto Each apparatus will now be described in more detail.

Figure 3:
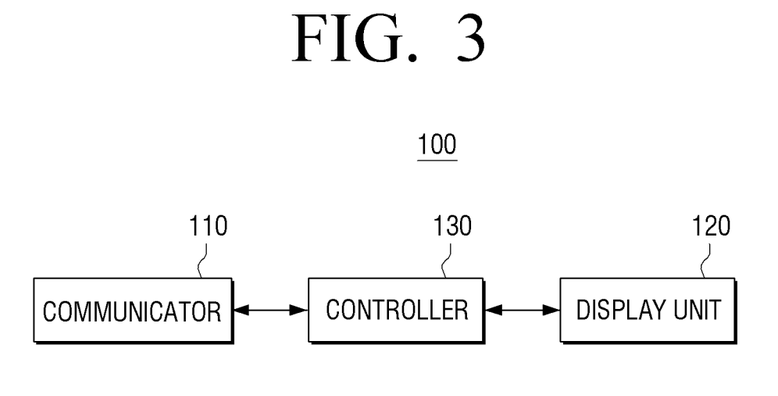
FIG. 3 is a block diagram illustrating a structure of a user terminal apparatus according to an exemplary embodiment.

FIG. 3 is a block diagram illustrating a structure of a user terminal apparatus 100, according to an exemplary embodiment.

Referring to FIG. 3, the user terminal apparatus 100 includes a communicator 110, a display unit 120, and a controller 130.

The communicator 110 exchanges data with the server 200.

The user terminal apparatus 100 transmits content viewing information to the server 200 through the communicator 110. The content viewing information refers to information about broadcast content that is currently viewed by the user terminal apparatus 100. For example, the content viewing information may be at least one of metadata, electronic program guide (EPG) information, fingerprint information, a capture screen, and content data of a broadcast content.

The communicator 110 receives information about one of a plurality of channels on which the content is broadcast, from the server 200. For example, the server 200 may inform the communicator 110 that the content is currently broadcast on channel A. Since a home TV or a set-top box directly receives a broadcast signal through a broadcasting station and displays a content along with a broadcast channel, the user terminal apparatus 100 generally stores channel information of the content. If content is received through a repeater such as a smart terminal apparatus, the user terminal apparatus 100 may not store channel information or source information of the content. In this case, the user terminal apparatus 100 transmits the content viewing information to the server 200 and may detect channel information from the server 200 through an additional comparison. Therefore, according to this method, channel information is searched and then provided to the user terminal apparatus 100.

A process of providing content viewing information from the user terminal apparatus 100 to the server 200 and receiving channel information from the server 200 may be repeatedly performed at preset time intervals. The preset time intervals may be very short and may be performed in real time.

The communicator 110 is involved in transmitting and receiving various types of information, which will be described later. This operation will be described in more detail when describing a function of the controller 130.

The communicator 110 may be realized as various types of communication technologies. The communicator 110 may mainly include a near field communication (NFC) module, but is not limited thereto. In this case, the user terminal apparatus 100 may be connected to a repeater through the NFC module to be provided with a service from the server 200 on the Internet.

For example, the communicator 110 may comply with a WiFi communication standard. A WiFi module performs NFC according to an IEEE 802.11 technology standard. According to the IEEE 802.11 technology standard, a single carrier direct sequence spread spectrum (DSSS) wireless communication technology and a multi carrier orthogonal frequency multiplexing (OFDM) wireless communication technology are used.

According to another exemplary embodiment, the communicator 110 may be realized as various types of mobile communication technologies. In other words, the communicator 110 may include a cellular communication module which may transmit and receive data by using an existing wireless telephone network. For example, a 3G mobile communication technology may be applied. In other words, at least one technology of wideband code division multiple access (WCDMA), high speed downlink packet access (HSDPA), a high speed uplink packet access (HSUPA), and high speed packet access (HSPA), may be applied.

Alternatively, a 4G mobile communication technology may be applied. 2.3 GHz (portable Internet) mobile WiMAX or WiBro is an Internet technology that may be used even on the high-speed move.

A 4G long term evolution (LTE) technology may be applied. LTE is an extension technology of WCDMA that is based on OFDMA and multiple-input multiple-output (MIMO) technologies. Since WCDMA technology is used, an existing network may be used.

As described above, WiMAX, WiFi, 3G, LTE, or the like having a wide bandwidth and high efficiency may be used. However, in an exemplary embodiment, an amount of transmitted data is not large, and thus a more efficient technology may be used. In other words, other NFC modules such as a Bluetooth module, an infrared data association (IrDA) module, an NFC module, a Zigbee module, etc. and a wireless local area network (WLAN) module may be applied.

The controller 130 controls an overall operation of the user terminal apparatus 100.

In particular, the controller 130 controls the communicator 110 to request viewing pattern information of the plurality of channels on which the contents are broadcast, from the server 200. Here, the request for the viewing pattern information may be of various forms.

For example, channel information where an increase in a viewer rating is the largest for a short time may be requested, but channel information where a decrease in a viewer rating is the lowest may be requested. Also, such information may be requested according to genres such as news, drama, entertainment, movies, sports, etc. Only viewers in the Asian region may be targeted or viewers through the world may be targeted. Additionally, different age groups may be targeted. For example, viewers in the 20's age group may be targeted, or viewers of all age groups may be targeted. As described above, various queries may be generated to request viewing pattern information.

In addition, the channel information may be informed for a preset time without interrupting viewing and may be displayed in a pop-up form or a channel recommendation function may be turned off when a user selects an icon.

The controller 130 may control the communicator 110 to receive viewing pattern information, which is calculated based on a viewer rating acquired by aggregating the transmitted channel information, from the server 200.

The controller 130 includes a hardware element such as a micro processing unit (MPU), a central processing unit (CPU), a cache memory, a data bus, or the like and a software element such as an operating system (OS) or an application performing a particular purpose. A control command for elements for an operation of the user terminal apparatus 100 may be read from a memory according to a system clock, and an electrical signal may be generated according to the read control command to operate elements of hardware.

The display unit 120 displays various types of objects according to an operation of the controller 130. In particular, the display unit 120 receives the viewing pattern information, which is calculated based on the viewer rating acquired by aggregating the transmitted channel information, from the server 200 and displays the viewing pattern information.

For example, the display unit 120 may receive and display viewer rating change information of each channel. In other words, the display unit 120 may display viewer rating information of each channel on a graph and may express the viewer rating information numerically.

The user may set an interested channel through a user input unit such as a remote controller or the like. In this case, if a viewer rating of the interested channel set by the user increases to be higher than or equal to a preset increase, the controller 130 may control the display unit 120 to receive and display a content of the interested channel. In this case, the display unit 120 may display the content in a picture-in-picture (PIP) mode to display the content in an area of a display screen that is currently viewed.

Information about a channel of which viewer rating suddenly increases in real time may be displayed in a keyword form. The controller 130 controls the display unit 120 to display keyword information about the channel of which viewer rating suddenly increases in real time in an area of a screen.

If viewing of content is ended, and the user terminal apparatus 100 is not turned off, a next channel to be viewed may not be determined, and channel zapping may be performed. Here, the controller 130 may determine a channel zapping command. In other words, if a new content is requested from a broadcast server within a preset time, the controller 130 may determine that a channel zapping command is input. Alternatively, only if the channel zapping command is repeatedly input a plurality of times, the controller 130 may determine that the channel zapping command is meaningful.

If it is determined that the channel zapping command is input, the server 200 may recommend the most popular channel and provide the most popular channel to the user terminal apparatus 100. For example, the server 200 may provide information about a channel that is selected the most. This may be performed by an additional broadcast providing server not by the server 200.

The channel zapping channel may be determined by an additional broadcast server not by the controller 130 of the user terminal apparatus 100. In this case, if the user terminal apparatus 100 repeatedly requests a broadcast content within a preset time, the broadcast server may determine that the request is a zapping command and recommend broadcasting content information of which viewer rating is high.

For example, the broadcast server may recommend a channel that is selected the most by the user who views a broadcast program after the broadcast program viewed by the user terminal apparatus 100 ends.

The display unit 120 may be designed as various types of display panels. In other words, the display unit 120 may be realized as various types of display technologies such as an organic light-emitting diode (OLED), a liquid crystal display panel (LCDP), a plasma display panel (PDP), a vacuum fluorescent display (VFD), a field emission display (FED), an electro luminescence display (ELD), etc. A display panel may be of light-emission type and does not exclude a reflective type display (E-ink, P-ink, photonic crystal). The display unit 120 may also be realized as a flexible display, a transparent display, or the like.

Figure 4:
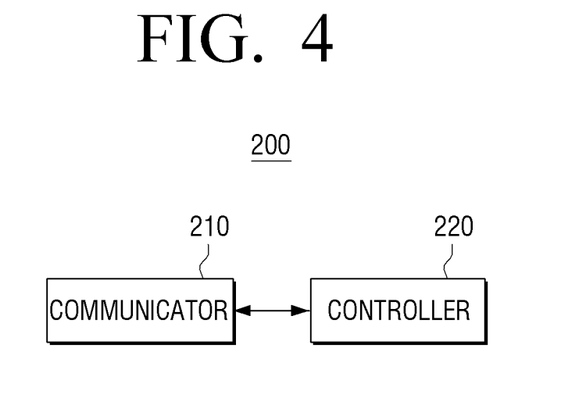
FIG. 4 is a block diagram illustrating a structure of a server according to an exemplary embodiment.

FIG. 4 is a block diagram illustrating a structure of the server 200, according to an exemplary embodiment.

Referring to FIG. 4, the server 200 includes a communicator 210 and a controller 220.

The communicator 210 transmits and receives various types of information to and from the user terminal apparatus 100.

The communicator 210 first receives content viewing information from the user terminal apparatus 100. As described above, the content viewing information refers to information about a broadcast content that is currently viewed by the user terminal apparatus 100.

As will be described later, the communicator 210 transmits and receives various types of data.

The communicator 210 may be realized as various types of technical modules. The communicator 210 may be realized as an NFC module or a mobile communication unit as described above. However, if the server 200 is connected to the Internet to provide a service, the communicator 210 may comply with transmission control protocol (TCP)/Internet protocol (IP) that is a standard protocol for transmitting information on the Internet. TCP is a rule about a technology that divides transmission data into preset units and packs the preset units, and IP is a rule about a technology that directly exchanges data.

The controller 220 controls an overall operation of the server 220.

In particular, the controller 220 searches for information about a channel on which content is broadcast among a plurality of channels that are on air of being broadcasted, by using the received content viewing information. As described above, the content viewing information may be at least one of metadata, EPG information, fingerprint information, a capture screen, and content data. The controller 220 searches for information about a channel on which the content is broadcast among the plurality of channels that are on air, by using such information. In detail, the controller 220 searches for a content that matches the content. The controller 220 identifies channel information of the corresponding content.

The controller 220 also controls the communicator 210 to transmit the identified channel information to the user terminal apparatus 100.

The controller 220 aggregates the transmitted channel information to calculate a viewer rating of each channel.

A process of providing the content viewing information from the user terminal apparatus 100 to the server 200 and receiving channel information from the server 200 and a process of aggregating a viewer rating may be periodically performed. The period may be very short and may be realized in real time.

Also, in order to perform this process, a large number of logs may be efficiently collected and calculated from a plurality of servers by using a real-time distributed cue system. In particular, a large number of log streams are systematically analyzed by using a real-time stream processing system to extract a viewer rating. For example, a big data processing system such as a Hadoop system may be used.

In addition, if the user terminal apparatus 100 requests viewing pattern information, the controller 220 controls the communicator 210 to provide the viewing pattern information including viewer rating information about the transmitted channel information.

In particular, the controller 220 may detect and provide a channel of which real-time viewer rating suddenly increases and content information through a stream analysis and a viewer rating analysis algorithm.

In order to detect a suddenly increasing viewer rating, an exponentially weighted moving average (EWMA) algorithm may be used to generate an average value and a threshold value of each channel putting weight on recent information. If a result higher than or equal to the threshold value is calculated, each channel may be regarded as a channel of which viewer rating suddenly increases The EWMA algorithm is mainly used in the field of anomaly detection and easily detects a slight change in the viewer rating. When α is a constant for giving weight to a recent viewer rating at a time t, an average pi is calculated as an equation as follows.

$$\mu t = \alpha \mu t - 1 + (1-\alpha) Xt$$

When at and m are multiplier constants, a standard deviation Xt of a suddenly increasing threshold value is calculated at the time according to the following condition.

$$|Xt - \mu t| > m\sigma t$$

The weight constant α and the multiplier constant m are designed to be changed anytime.

The server 200 may further include a storage (not shown) to process a large amount of data as described above. The storage stores content viewing information collected from a plurality of user terminal apparatuses 100, viewer rating information calculated through identified channel information, and big data information for calculating the viewer rating information.

The storage unit may be realized as various types of technical modules. If big data information such as Hadoop is stored, the storage stores a program language for loading, converting, and arranging a distributed file system and data. Also, a column-based database (DB) is loaded, and other management tools are included. A type of DB is not limited, but if a system such as Hadoop is used, a relational DB may be used.

The controller 220 may provide viewer rating change information of each channel to the user terminal apparatus 100.

If a viewer rating of an interested channel set by a user of the user terminal apparatus 100 increases, the controller 220 may control the communicator 110 to provide a content of the interested channel. A method of determining an increase in a viewer rating is as described above.

As described above, the controller 220 may transmit a graphical user interface (GUI) to the user terminal apparatus 100 so as to receive and display viewer rating change information of each channel through the display unit 120 of the user terminal apparatus 100.

If it is determined that the user terminal apparatus 100 is a user terminal that performs channel zapping, the controller 220 may control the communicator 210 to provide information about a channel that is selected the most by the user.

If viewing of content ends as described above, and the user terminal apparatus 100 is not turned off, a next channel to be viewed may not be determined, and channel zapping may be performed. Here, the controller 130 of the user terminal apparatus 100 may determine a channel zapping command. In other words, if a new content is requested from the broadcast server within a preset time, the user terminal apparatus 100 may determine that the channel zapping command is input. If the channel zapping command is repeatedly input a plurality of times, the user terminal apparatus 100 may determine that the channel zapping command is meaningful.

If it is determined that the channel zapping command is input, the server 200 may recommend the most popular channel and provide the most popular channel to the user terminal apparatus 100. For example, the server 200 may provide information about a channel that is selected the most.

Also, as described above, the channel zapping command may be determined by the server 200 not by the controller 130 of the user terminal apparatus 100. In this case, if the user terminal apparatus 100 repeatedly requests a broadcast content within a preset time, the server 200 may determine that the channel zapping command is input and recommend broadcast content information of which viewer rating is high. For example, the server 200 may recommend a channel onto which a user viewing a broadcasting program moves to or selects the most after the broadcast program viewed by the user terminal apparatus 100 ends.

A method of providing various types of viewing pattern information according to an exemplary embodiment will now be described.

Figure 5:
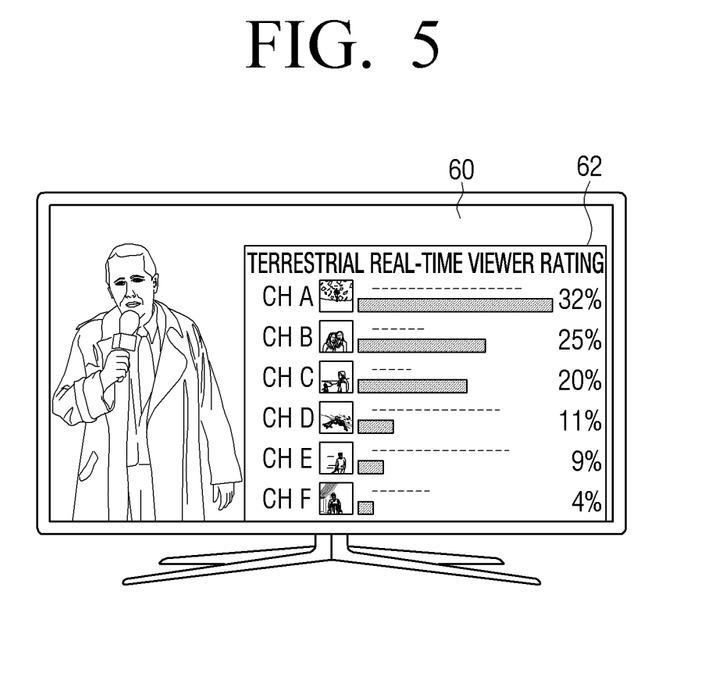
FIGS. 5 through 7 are views illustrating a method of providing various types of viewing pattern information, according to the exemplary embodiments.
Figure 6:
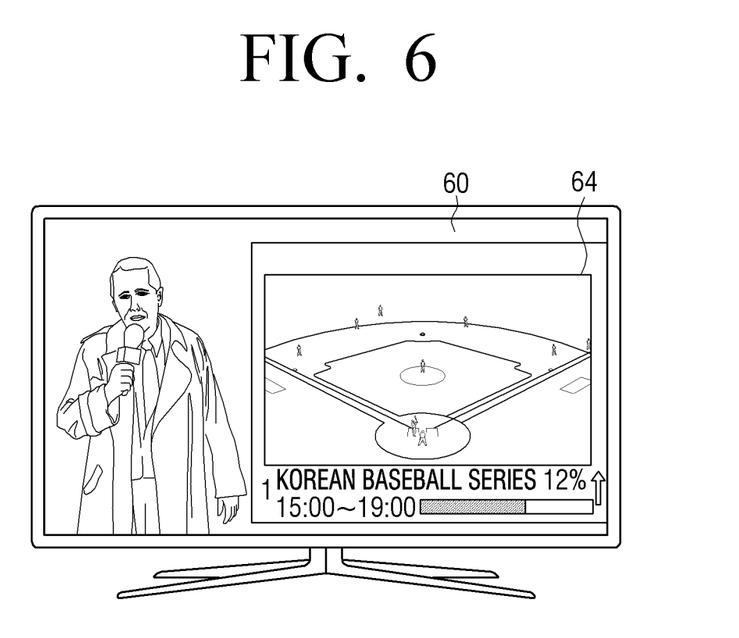
Figure 7:
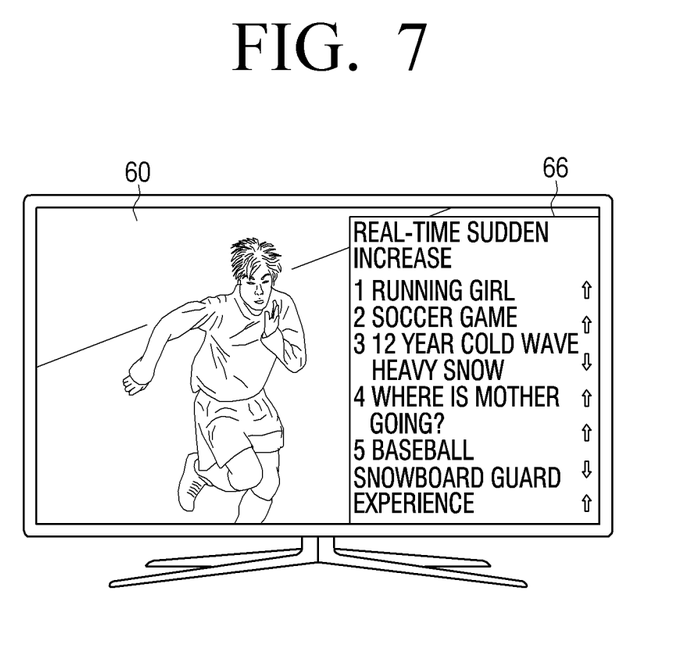

FIGS. 5 through 7 are views illustrating a method of providing various types of viewing pattern information according to an exemplary embodiment.

As shown in FIG. 5, the server 200 may provide viewer rating change information of each channel to the user terminal apparatus 100, and the user terminal apparatus 100 may receive and display the viewer rating change information. In other words, the user terminal apparatus 100 may display the viewer rating information on a graph and express the viewer rating information numerically. In FIG. 5, a momentary viewer rating of channel A is 32%, i.e., is the highest.

Here, the user terminal apparatus 100 provides a function of selecting channels of which viewer ratings are shown. In other words, the user may directly change a channel into a channel indicated through a user input unit such as a remote controller or the like.

The user may also set an interested channel through the user input unit such as the remote controller or the like. In this case, if a viewer rating of the interested channel set by the user increases to be higher than or equal to a preset increase, the controller 130 may control the display unit 120 to receive and display a content of the interested channel. In this case, the controller 130 may control the display unit 120 to display the content of the interested channel in a PIP mode so as to display the content in an area of a display screen. FIG. 6 is a view illustrating a content of an interested channel, according to an exemplary embodiment. Also, in this case, a channel may be set to be automatically changed into a corresponding channel.

In addition, information about a channel of which viewer rating suddenly increases in real time may be displayed in a keyword form as shown in FIG. 7.

Figure 8:
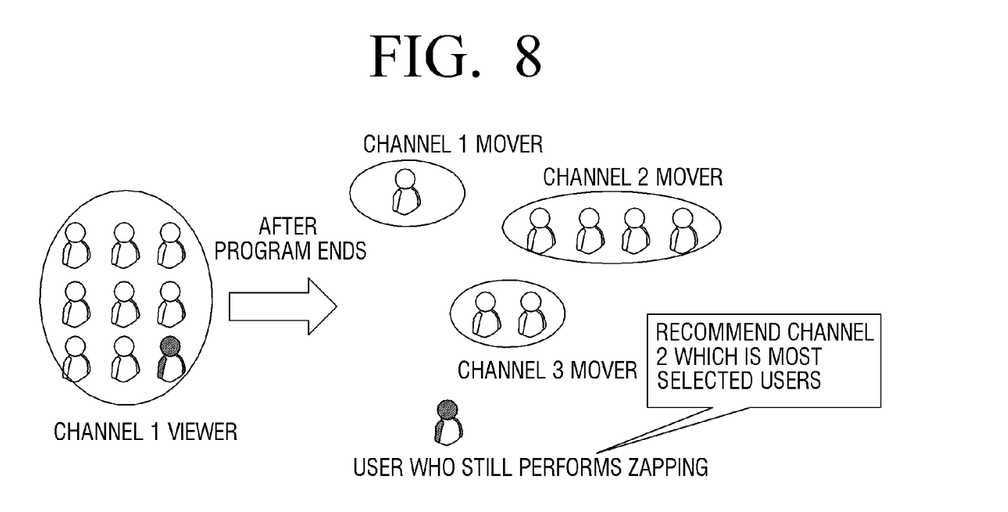
FIG. 8 is a view illustrating a method of recommending a channel if a channel zapping command is input, according to an exemplary embodiment.

FIG. 8 is a view illustrating a method of recommending a channel if a channel zapping command is input, according to an exemplary embodiment.

FIG. 8 illustrates a recommended service of a user terminal apparatus if a broadcast program of a channel that is viewed ends, and a user does not determine a next channel that the user will view but performs channel zapping. After the broadcast program viewed by the user ends, the server 200 recommends a channel which the user viewing the same broadcasting program selects the most and transmits information about the channel to the user terminal apparatus 100. In FIG. 8, channel 2 is a channel which is selected the most by users.

A method of providing viewing pattern information according to various exemplary embodiments will now be described.

Figure 9:
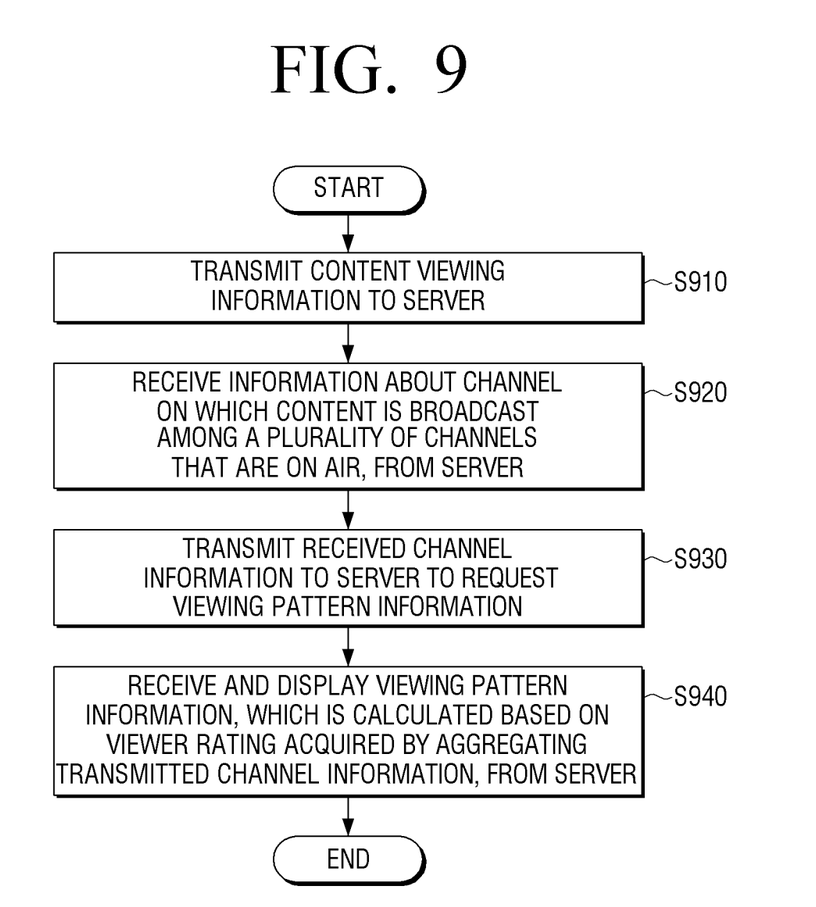
FIGS. 9 and 10 are flowcharts illustrating a method of providing viewing pattern information, according to various exemplary embodiments.
Figure 10:
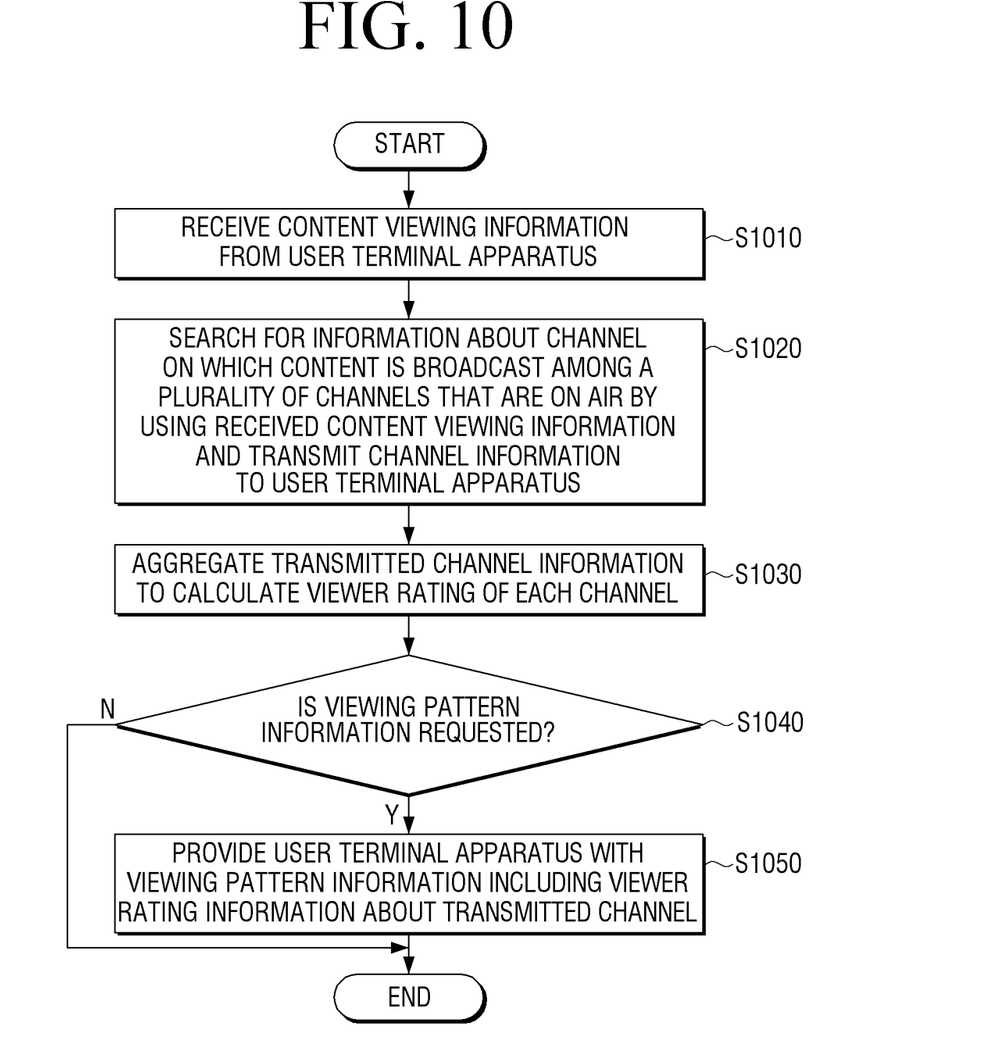

FIGS. 9 and 10 are flowcharts illustrating a method of providing viewing pattern information, according to exemplary embodiments.

Referring to FIG. 9, in operation S910, content viewing information of a user terminal apparatus is transmitted to a server. In operation S920, information about a channel on which content is broadcast among a plurality of channels that are on air is received from the server. In operation S930, viewing pattern information of the plurality of channels is requested from the server. In operation S940, viewing pattern information that is calculated based on a viewer rating acquired by aggregating the transmitted channel information is received and displayed.

Here, in operation S910, EPG information or fingerprint information about a content that is viewed may be transmitted to the server.

In operation S940, viewer rating change information of each channel may be received and displayed.

Also, in operation S940, if a viewer rating of an interested channel set by a user increases, a content of the interested channel may be received and displayed.

In addition, in operation S940, if it is determined that the user terminal apparatus is a user terminal that performs channel zapping, a channel onto which is the most selected by users may be received and displayed.

Referring to FIG. 10, in operation S1010, content viewing information is received from a user terminal apparatus. In operation S1020, information about a channel on which content is broadcast is searched among a plurality of channels that are on air by using the received content viewing information and then transmitted to the user terminal apparatus. In operation S1030, the transmitted channel information is aggregated to calculate a viewer rating of each channel. If the user terminal apparatus requests viewing pattern information in operation S1040, the viewing pattern information including viewer rating information about the transmitted channel is provided to the user terminal apparatus in operation S1050.

In operation S1010, EPG information or fingerprint information about a content that is viewed may be received from the user terminal apparatus.

In operation S1050, viewer rating change information of each channel may be provided.

In operation S1050, if a viewer rating of an interested channel set by a user of the user terminal apparatus increases, a content of the interested channel may be provided.

In operation S1050, if it is determined that the user terminal apparatus is a user terminal that performs channel zapping, information about a channel onto which is the most selected by users may be provided.

According to various exemplary embodiments as described above, viewing information may be acquired and fed back from a user terminal apparatus in real time to provide viewing pattern information in real time. Therefore, a broadcast search may be easily performed in the user terminal apparatus.

Also, viewing information may not be acquired from some apparatuses, and viewing information may be acquired from all of apparatuses viewing a broadcast and then processed to provide accurate viewing pattern information.

The above-described user activity prediction method may be stored in a program form on a non-transitory computer-readable medium. The non-transitory computer-readable medium refers to a medium which does not store data for a short time such as a register, a cache memory, a memory, or the like but semi-permanently stores data and is readable by a device. In detail, the above-described applications or programs may be stored and provided on a non-transitory computer readable medium such as a CD, a DVD, a hard disk, a blue-ray disk, a universal serial bus (USB), a memory card, a ROM, or the like. In particular, the above-described user activity prediction method may be established, recorded, and managed in DB and big data forms on a large capacity hard disk.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of providing viewing pattern information, the method being performed by a user terminal apparatus, the method comprising:
   transmitting content viewing information of the user terminal apparatus to a server;
   receiving information of a channel on which a content is broadcast among a plurality of channels that are on air, from the server;
   requesting the viewing pattern information of the plurality of channels from the server;
   receiving the viewing pattern information from the server, and displaying the viewing pattern information, the viewing pattern information being determined based on viewer ratings that are determined by aggregating respective information of the plurality of channels; and
   in response to a viewer rating of an interested channel that is set by a user increasing, among the viewer ratings, receiving a content of the interested channel, and displaying the content of the interested channel.

2. The method of claim 1, wherein the transmitting comprises transmitting at least one among electronic program guide (EPG) information and fingerprint information of a content that is viewed, to the server.

3. The method of claim 1, wherein the receiving and displaying the viewing pattern information comprises:
   receiving, from the server, viewer rating change information of each of the plurality of channels; and
   displaying the viewer rating change information of each of the plurality of channels.

4. The method of claim 1, wherein the receiving and displaying the viewing pattern information comprises in response to the user terminal apparatus performing channel zapping, receiving, from the server, information of a channel that is selected most by users, and displaying the channel that is selected most.

5. The method of claim 1, wherein the receiving and displaying the content of the interested channel comprises in response to the viewer rating of the interested channel increasing to be greater than or equal to a threshold, receiving the content of the interested channel, and displaying the content of the interested channel.

6. A method of providing viewing pattern information, the method being performed by a server, the method comprising:
   receiving content viewing information from a user terminal apparatus;
   searching for information of a channel on which a content is broadcast among a plurality of channels that are on air based on the received content viewing information;

transmitting the information of the channel to the user terminal apparatus;
aggregating respective information of the plurality of channels to determine viewer ratings;
receiving, from the user terminal apparatus, a request for the viewing pattern information of the plurality of the channels;
transmitting, to the user terminal apparatus, the viewing pattern information that is determined based on the viewer ratings; and
in response to a viewer rating of an interested channel that is set by a user of the user terminal apparatus increasing, among the viewer ratings, transmitting a content of the interested channel to the user terminal apparatus.

7. The method of claim 6, wherein the receiving the content viewing information comprises receiving at least one among electronic program guide (EPG) information and fingerprint information of a content that is viewed, from the user terminal apparatus.

8. The method of claim 6, wherein the transmitting the viewing pattern information comprises transmitting, to the user terminal apparatus, viewer rating change information of each of the plurality of channels.

9. The method of claim 6, wherein the transmitting the viewing pattern information comprises in response to the user terminal apparatus performing channel zapping, transmitting, to the user terminal apparatus, information of a channel that is selected most by users.

10. A user terminal apparatus comprising:
a display;
a communicator configured to:
    transmit content viewing information of the user terminal apparatus to a server; and
    receive information of a channel on which a content is broadcast among a plurality of channels that are on air, from the server; and
a controller configured to:
    request viewing pattern information of the plurality of channels from the server;
    receive the viewing pattern information from the server, and control the display to display the viewing pattern information, the viewing pattern information being determined based on viewer ratings that are determined by aggregating respective information of the plurality of channels; and
    in response to a viewer rating of an interested channel that is set by a user increasing, among the viewer ratings, receive a content of the interested channel, and control the display to display the content of the interested channel.

11. The user terminal apparatus of claim 10, wherein the communicator is configured to transmit at least one among electronic program guide (EPG) information and fingerprint information of a content that is viewed, to the server.

12. The user terminal apparatus of claim 10, wherein the controller is configured to:
    receive, from the server, viewer rating change information of each of the plurality of channels; and
    control the display to display the viewer rating change information of each of the plurality of channels.

13. The user terminal apparatus of claim 10, wherein in response to the user terminal apparatus performing channel zapping, the controller is configured to receive, from the server, information of a channel that is selected most by users, and control the display to display the channel that is selected most.

14. A server comprising:
a communicator configured to:
    receive content viewing information from a user terminal apparatus,
    search for information of a channel on which a content is broadcast among a plurality of channels that are on air based on the received content viewing information; and
    transmit the information of the channel to the user terminal apparatus; and
a controller configured to:
    aggregate respective information of the plurality of channels to determine viewer ratings;
    receiving, from the user terminal apparatus, a request for viewing pattern information of the plurality of channels;
    transmitting, to the user terminal apparatus, the viewing pattern information that is determined based on the viewer ratings; and
    in response to a viewer rating of an interested channel that is set by a user of the user terminal apparatus increasing, among the viewer ratings, transmit a content of the interested channel to the user terminal apparatus.

15. The server of claim 14, wherein the communicator is configured to receive at least one of among electronic program guide (EPG) information and fingerprint information of a content that is viewed, from the user terminal apparatus.

16. The server of claim 14, wherein the controller is configured to transmit, to the user terminal apparatus, viewer rating change information of each of the plurality of channels.

17. The server of claim 14, wherein in response to the user terminal apparatus performing channel zapping, the controller is configured to transmit, to the user terminal apparatus, information of a channel that is selected most by users.

18. A method of providing viewing pattern information, the method being performed by a user terminal apparatus, the method comprising:
transmitting content viewing information to a server;
receiving, from the server, a graphical user interface (GUI) that displays real-time viewer rating change information of a plurality of channels; and
in response to a viewer rating of an interested channel that is set by a user increasing, among the real-time viewer rating change information, receiving a content of the interested channel, and displaying the content of the interested channel.

19. The method of claim 18, wherein when a viewer rating of one of the plurality of channels is greater than a predetermined threshold, displaying the one of the plurality of channels in a picture-in-picture (PIP) mode.

20. The method of claim 18, wherein the content viewing information is at least one among metadata, electronic program guide (EPG) information, fingerprint information, a capture screen, and content data of a content that is viewed.

* * * * *